April 11, 1939.    V. M. NIDEVER    2,153,673
ANIMAL ACTUATED DOOR
Filed Aug. 19, 1937    2 Sheets-Sheet 1
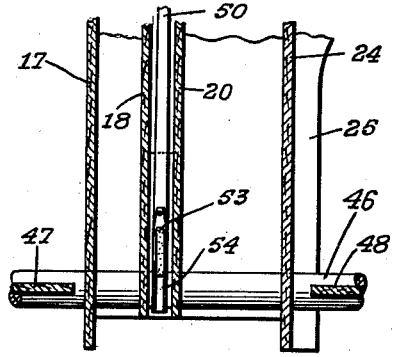
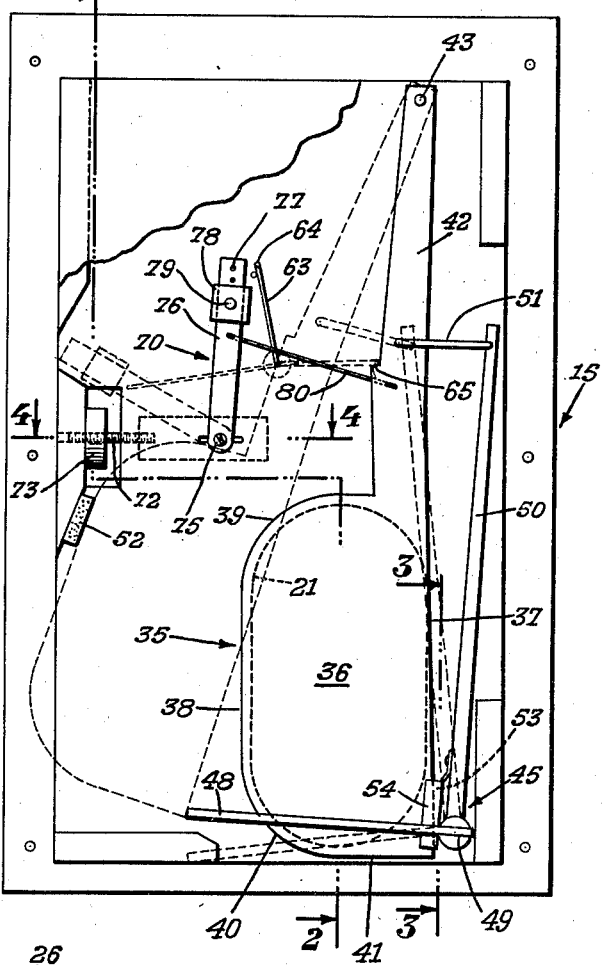
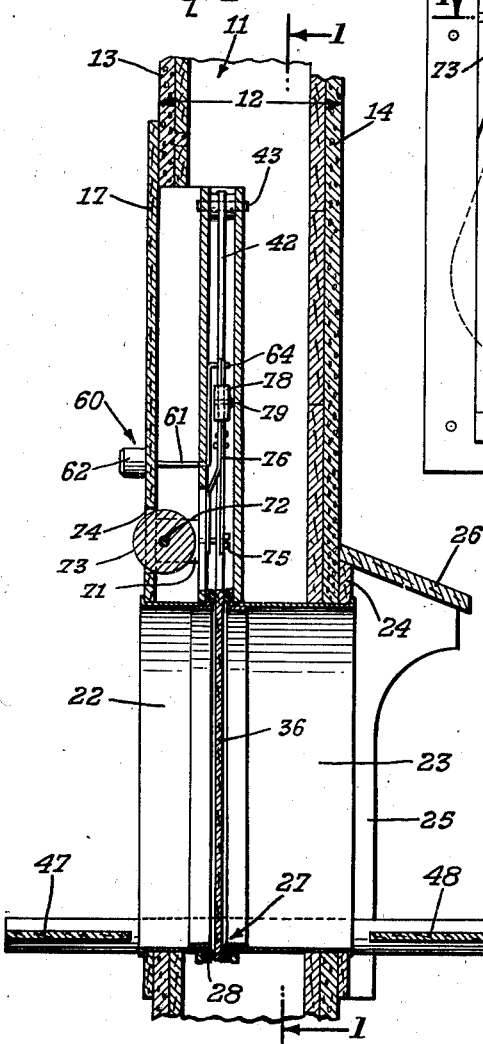
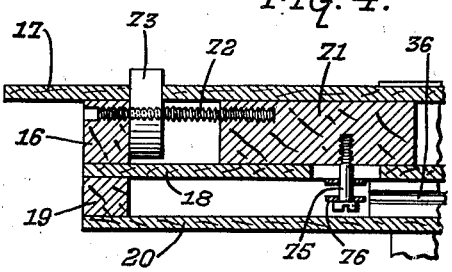
Inventor.
V. M. Nidever.
By Hazard and Miller
Attorneys.

April 11, 1939. V. M. NIDEVER 2,153,673
ANIMAL ACTUATED DOOR
Filed Aug. 19, 1937 2 Sheets-Sheet 2
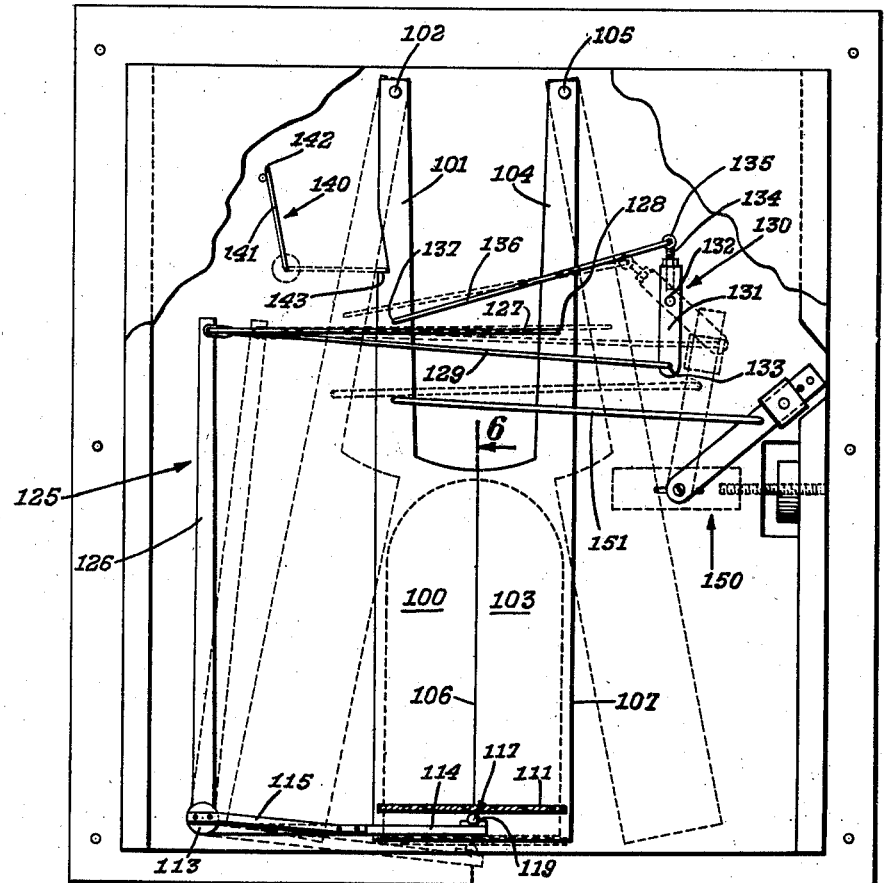
Inventor.
V. M. Nidever
By Hazard and Miller
Attorneys.

Patented Apr. 11, 1939

2,153,673

UNITED STATES PATENT OFFICE 2,153,673

ANIMAL ACTUATED DOOR

Vernon M. Nidever, Carpenteria, Calif.

Application August 19, 1937, Serial No. 159,897

13 Claims. (Cl. 119—22)

My invention pertains to a type of door which may be actuated for opening by an animal or poultry and held open until the passage of such animal or poultry completely through the door, the action being due to the weight of the animal or poultry. Of course it is obvious that such door might be made on a scale suitable for animals of any size or readily applied to garage or barn doors actuated and controlled by a vehicle passing through the door.

An object or feature of my invention relates to a pivotally suspended door in which the suspension pivot is a considerable distance above the door opening and whereby on actuation of a treadle due to the weight of the animal stepping thereon and by a system of interconnected levers and links, the door may be swung on its pivot to leave an unobstructed door opening. A further characteristic of my invention is having complementary treadles on the inside and outside of the door so that the animal passing therethrough transfers his weight from one treadle to another and hence when the door is opened initially it is held open until the animal steps off the second treadle. Considered more in detail a characteristic of my invention in this regard comprises providing a structure in a wall with a door opening and having this intersected by a door panel with a pivot arm extending above the panel to the door pivot. An operating rock shaft extends through the wall and has an inside and outside treadle connected thereto. A lever arm is also connected to the rock shaft and has a link connection to the pivot arm of the door panel so that when the treadle is depressed the rock shaft in a partial rotation swings the door panel on its pivot to an open position. A further detail characteristic of this main feature is dividing the door into two door panels, each having a pivoted arm whereby the panels may swing outwardly one from the other. This type is designed for larger animals such as a barn door construction and in this case the treadle is arranged in the form of a ramp having an operating connection to the rock shaft to rotate this and hence develop a similar movement by links and complementary levers to the pivot arms of the two door panels.

Another object and characteristic feature of my invention is the employment of a pivotally mounted counterweight which is connected by a link to the pivot arm of the panel and having the action of either slowing down i. e. retarding or accelerating the closing of the door panel. This then gives ample time for an animal to fully clear the door should the weight be transferred quickly off the second treadle. A detail feature of the mounting of the counterweight is providing for an adjustment of the pivot point so that by changes of this point of pivoting the counterweight which is on a counterweight arm may be changed as to its reaction. My invention also comprehends a latch which may be operated from the inside of the building to positively lock or latch the door panel in its closed position.

My invention is illustrated in connection with the accompanying drawings, in which:

Fig. 1 is a vertical section taken on the section line 1—1 of Fig. 2 partly broken away to show the interior details.

Fig. 2 is a vertical transverse section on the irregular section line 2—2 Fig. 1 taken in the direction of the arrows.

Fig. 3 is a vertical transverse section on the line 3—3 of Fig. 1 showing a detail of the rock shaft, the treadles and the operating lever.

Fig. 4 is a horizontal transverse section on the line 4—4 of Fig. 1 in the direction of the arrows showing the adjustment of the pivot of the counterweight lever.

Fig. 5 is an inside elevation partly broken away of a modification showing duplicate door panels.

Fig. 6 is a vertical transverse section on the line 6—6 of Fig. 5 in the direction of the arrows to illustrate the construction and operation of the treadle ramps.

Fig. 7 is a plan of the treadle ramps taken in the direction of the arrow 7 of Fig. 6.

This construction of door is of a type which may be built into an outside wall of a house or the like, the small type of door being useful for small dogs or cats and the larger or double panel type better for large animals such as large dogs or domestic live stock. Referring to the construction of Figs. 1 through 4, the wall of a building is indicated by the numeral 11 having the dimension 12 between the inside wall 13 and the outside wall 14. These walls are illustrated as being plaster or stucco on the usual framing and having wall studs or the like but of course it is obvious that other types may be utilized. In my invention I employ a door assembly frame 15 which has main vertical stiles 16 with an inside panel 17 secured thereto. Secured to the stile 16 there is an intermediate vertical partition 18 outside of which are secondary spacing stiles 19 and an inner panel 20. These panels have an opening 21, this being shown as oval and an inside lining 22 preferably of sheet metal extends through the openings through the inside panel 17 and an intermediate panel 18. There is also an outer lining 23 which extends from the inside panel 20 outwardly through an opening in the outer wall 14. Around this there is an outside wall 24 having vertical stiles 25 and a roof section 26. The linings have their inner edges spaced apart forming an opening indicated at 27 for operation of the door and at these openings there is a felt or rubber gasket 28 against which the door panel hereunder detailed operates and thus being adapted to prevent drafts blowing around the door panel. This opening in the linings 22 and 23 is between the panels 18 and 20.

The door assembly designated by the numeral 35 includes a door panel 36. Such panel has a straight inner edge 37, a parallel outer edge 38, curved upper and lower corners 39 and 40 and a horizontal bottom edge 41 joining the edge 37. The door panel is slightly larger in area than the door opening 21. The suspension pivot arm 42 is formed integral with the door panel and extends upwardly having an upper pivotal connection 43 to the panels 18 and 20, the door panel swinging between these panels or partitions.

The door actuating mechanism designated by the assembly numeral 45 includes a rock shaft 46 which extends through the inner panel 17, the intermediate panels 18 and 20 and the outside wall 24. This may be journalled in any suitable manner in these panels. Attached to the rock shaft there is an inside treadle 47 and an outside treadle 48, these preferably being boards, each fitted in a slot 49 in the rock shaft, such shaft being preferably made of wood. The treadles extend across the door opening and normally in all positions have a portion above the bottom of the door opening. A single lever 50 is connected to the rock shaft. This extends upwardly between the panels 18 and 20 and has a pivoted link 51 connected between the upper end of the lever and the pivot arm 42 of the door panel. Therefore when an animal for instance steps on the inside treadle 47, the rock shaft is turned through a part rotation. This causes a movement of the lever 50 and the link 51 in a thrust action swings the arm 42 and the door panel from the full to the dotted line position of Fig. 1. A rubber or similar bumper 52 mounted on the stile 19 checks the motion of the panel in opening and a second rubber bumper 53 attached to a metal channel 54 which is secured to the lever 50 and the rock shaft 46, catches the door panel when it closes.

A latch or lock for the door designated by the assembly numeral 60 employs a rod 61 having a knob 62 and mounted for rotation in the inner panel 17 and the intermediate panel 18. A radial section 63 operates between the panels 18 and 19 and a bent detent 64 engages on a ledge 65 of the pivot arm 42. Thus when the door is in its closed position and this latch arm is swung from the full to the dotted line position of Fig. 1, the detent engages on the ledge 65 and thus prevents a swinging movement of the door panel and its pivot arm 42.

The counterweight assembly designated by the numeral 70 employs a sliding pivot block 71 (note Fig. 4) mounted for sliding on suitable guides between the panels 17 and 18 and operated by a screw 72, this being provided with a knurled finger operated disc 73 which extends outwardly through an opening 74 in the inner panel 17. This block 71 carries a fulcrum bolt 75 to which is connected a pivoted counterweight arm 76 extending upwardly, the arm being made of a pair of pieces of strip metal bent in U shaped form and having a series of perforations 77 with a counterweight 78 slidable on the arm and secured at any particular perforation by a pin 79. A cross link 80 is pivoted to the counterweight arm 76 and also to the arm 42, thus linking the counterweight arm with the door panel. It will hence be seen that when the door is swung from the closed position shown in full lines in Fig. 1 to the open position shown in dotted lines, the counterweight is moved from the position of full lines of Fig. 1 to the dotted line position depending on the position of the pivot bolt 75, the counterweight may be shifted decidedly from the vertical as shown in the dotted position of Fig. 1 and hence in resuming its normal position quite decidedly slows down or retards the action of the closing of the door whereas the counterweight is so positioned that it facilitates the opening of the door. The adjustment of the pivot 75 may thus be made so that a comparatively light weight on either of the treadles 47 or 48 is operative to open the door, hence the door is quite suitable for small animals of a considerable range of weight and also for poultry ranging in size and weight. The counterweight also retards the action of the door so that a small animal may step completely off one treadle and pass through the linings 22 and 23 should the wall be quite thick and step on the other treadle before the door closes, thus the weight transferred to the second treadle is operative to hold the door completely open until the animal steps off such latter treadle.

In the construction of Figs. 5, 6 and 7, the general frame structure is the same as that above described, however if this is made in large sizes for use as a domestic animal door, it is desirable to modify the construction to build the same into the housing structure. However the characteristic features employ a construction with a door opening 90 which is fitted with inner and outer liners 91 and 92. In this case these are shown each with a flat floor 93 and an arched top 94. There is a space 95 between the two liners with a channel construction 96 having a packing gasket 97 of felt or rubber, the door panels swinging between these gaskets or packings. In the construction illustrated these may be considered as having a first door panel 100 with a long pivot arm 101 pivoted at 102, a second door panel 103 with its pivot arm 104 and pivoted at 105 at the top. These door panels when closed have a vertical meeting edge 106 and the outside edges indicated at 107 are shown as parallel to this edge. The treadle assembly designated by the numeral 110 employs a ramp 111 which may be formed of a board having a transverse pivot or hinge 112 extending transversely and being preferably located on a floor level or the like. The rock shaft 113 is transverse and positioned spaced from the door opening and has a treadle arm 114 secured on the inside and the outside of the wall structure, the rock shaft projecting a sufficient amount for this purpose and preferably there is a brace 115 connecting the rock shaft and the treadle arm. In the construction the treadle arm is preferably made of a channel as indicated at 116 and this has a central ball bearing 117 in which there is a suitable cup 118 with a single ball 119 positioned therein. The central and upper end of the ramp treadle rests on this ball as indicated at 120. If the treadle is made of metal, its contact with the ball is sufficient, however if made of wood, there should be a metal plate or the like to engage the ball. Therefore the weight of the animal on the treadle ramp causse a pivoting of this on its hinge 112 and develops a downward movement of the treadle arm 114 due to the reaction through the ball 119.

The operating connection for the doors designated by the assembly numeral 125 includes a single lever 126 secured to the rock shaft 113 and extending upwardly. This has a first link 127 which connects at 128 to the pivot arm 104 of the door panel 103. A second and longer link 129 connects to a balanced lever 130. This lever consists of a rod 131 pivoted at 132 to a fixed structure, the link 129 is illustrated as being connected at the lower end 133. An adjustable connection 134 is shown as an eye-bolt attached to the upper end of the rod 131. This has an eye 135 at its upper end and a third link 136 extends from this eye to the pivot arm 101, being connected at 137.

Thus in the operation of the two-door device, as both of the ramp treadles are of the same construction, the weight of an animal on either treadle causes the rocking of the rock shaft 113 tilting the lever arm 126 from the full to the dotted line position of Fig. 5 through the medium of the first link 127, a thrust action on the pivot arm 104 swings the door panel 103 from the full to the dotted line position of Fig. 5. The second link 129 gives a rocking motion to the double lever 130 and hence transmits a thrust through the third link 136 to the arm 101 of the door panel 100, thus swinging this outwardly from the full to the dotted line position of Fig. 5. It will thus be seen that both door panels are simultaneously swung to their open position. If desired and necessary, bumpers may be provided to engage the panels at their full open and closed positions.

The latching assembly 140 is substantially the same in principle as that described and identified by the assembly numeral 60. In this an arm 141 with a detent 142 engages in a notch 143 on the pivot arm 101. Therefore it prevents movement of this arm and through the link 136, the lever 130, the link 129 and link 127, restrains the movement of the arm 104, and hence both of the door panels are locked in their closed position.

The counterweight assembly used in Fig. 5 and the associated figures is the same in principle as that of Figs. 1 through 4. In this case the counterweight assembly is designated by the numeral 150 and from the arm of the counterweight a link 151 extends to the arm 101 of the door panel 100. Such a link however could connect to the pivot arm 104 of the door panel 103. The illustration shows the counterweight arm and the door panels in one position in full lines, that is, with the panels closed and in dotted lines with the panels open and the counterweight moved. It is obvious that by changing the pivot point of the counterweight and also by making a different connection from the counterweight arm to the pivot arms, that the speed of the closing movement of the door panels may be regulated. Thus when an animal passes through a door of this character, the weight on one treadle ramp causes both doors to swing open. Should the wall be of such thickness that the animal cannot bear his weight on both treadles at the same time, the action of the counterweight may be adjusted to cause the closing of the door to be somewhat slow thereby giving ample time for the animal to move from one ramp to the other.

Various changes may be made in the details of the construction without departing from the spirit or scope of the invention as defined by the appended claims.

I claim:

1. A door construction comprising a frame adapted for incorporation in a wall structure, said frame having a door opening, a door panel with means suspending said panel from a pivot thereabove, a rock shaft extending through the said frame and having treadles adapted to be positioned one inside and the other outside of the wall and an interconnection between the rock shaft and the panel to swing the panel on its pivot on depression of either treadle.

2. A door construction as claimed in claim 1, a counterweight construction having a pivoted counterweight arm with means to adjust the position of the pivot, said pivot being in the frame, a weight on the counterweight arm and a link connection between the counterweight arm and the door panel whereby the movement of the panel on its pivot causes a movement of a counterweight on its pivot.

3. A door construction comprising a frame adapted for incorporation in an opening in a wall structure, said frame having a door opening, a door panel, a pivoted suspension arm connected to the panel and mounted to swing on a pivot above the panel, the pivot being in the said frame whereby the panel may swing from the pivot, a rock shaft extending through the frame and having an inside and outside treadle to be located on opposite sides of the wall structure, a lever arm connected to the rock shaft extending upwardly, and a link connecting the lever arm and the suspension arm whereby on depression of either treadle a movement communicated through the rock shaft to the lever arm and by the link to the suspension arm swings the door panel clear of the door opening.

4. A door construction as claimed in claim 3, a counterweight construction having a pivot with means to adjust said pivot in a horizontal plane, the pivot being transverse to the plane of the door panel, a counterweight arm mounted on the said pivot and having a counterweight thereon and a link between the counterweight arm and the suspension arm of the door panel whereby the movement of the door panel and its suspension arm is communicated to the counterweight arm and the counterweight thereon.

5. A door construction as claimed in claim 3, an inner and an outer lining extending from the said frame and of substantially the same shape as the door opening, said linings being adapted to extend to the outside of the wall structure, there being a space between the linings for the door panel and a packing means between each lining and the door panel.

6. A door construction comprising a frame having side stiles and a pair of opposite spaced panels secured thereto, each panel having a door opening, a pivot mounted in the said panels with a pivot arm suspended therefrom and extending between the said panels, a door panel secured to the lower end of the arm and adapted to form a closure for the said door openings, a rock shaft pivotally mounted in the said panels and extending transversely to the door panel, a lever arm connected to the rock shaft, a link between said lever arm and the pivot arm, two treadles, one on each side of the said frame and an operating connection between each treadle and the rock shaft to partly rotate said shaft due to the weight of an animal on a treadle and thereby move the said lever arm, the pivot arm and the door panel.

7. A door construction as claimed in claim 6, a counterweight construction including a block slidably mounted on one of the panels and having a counterweight pivot secured thereto, a counterweight arm mounted on the latter pivot and having an adjustable counterweight and a link connecting the counterweight arm and the pivot arm whereby when the pivot arm and door panel move, the counterweight arm is rotated on its pivot.

8. A door construction as claimed in claim 6, and a latch construction comprising a rod mounted for rotation in one of the said panels and having a radial section positioned between the two panels with a detent, the pivot arm having a notch to be engaged by the said detent whereby the pivot arm with the door panel may be latched in its closed position.

9. In a door construction, a frame having a first fixed pivot, a pivot arm suspended therefrom having a door panel, a counterweight construction having a second pivot adjustably mounted in said frame, a counterweight arm mounted on said latter pivot and having a counterweight, a link connecting the counterweight arm and the pivot arm, whereby in changes of the position of the said second pivot, the counterweighting action may be varied, and means to move the door panel and its pivot arm on the first pivot.

10. A door construction comprising a frame adapted to be inserted in an opening in a wall, a pair of door panels each having a pivot arm and each arm being suspended from a pivot in the upper part of the frame, the panels being adapted to abut edge to edge, there being a door opening in the frame closed by the said doors, a rock shaft, a lever arm connected thereto, an operating connection from the lever arm to each of the pivot arms, and two treadle constructions on opposite sides of the frame, each having a connection to the rock shaft whereby the weight of the animal on one treadle causes an operation of the shaft and lever arms and hence moves the two door panels to an open position.

11. A door construction as claimed in claim 10, the connection between the lever arm and the pivot arms including a double lever pivoted in the frame, a first link connected from the lever arm to the double lever, and a second link from the double lever to one of the pivot arms, and a connection from the lever arm to the other pivot arm.

12. A door construction as claimed in claim 10, each of the treadle constructions including an arm secured to the rock shaft, a treadle ramp having a hinge parallel to the door panels, and a bearing between the ramp and the arm of the rock shaft, whereby on depression of the treadle ramp the said arm and the rock shaft are rotated a part of a turn.

13. A door construction comprising a frame having means for attachment to a wall at an opening, the said frame having a door opening, a pair of fixed pivots in the frame, a pivot arm suspended from each pivot and each pivot arm having a door panel, the door panels being adapted to abut on a vertical line through the center of the door opening, two treadle devices, one on each side of the frame, an interconnecting means between the treadles with means to simultaneously swing both panels and pivot arms to simultaneously open the doors, and a counterweight construction including a pivot adjustable in the frame, a counterweight arm rotatable thereon and having a counterweight and a link connecting the counterweight arm and one of the pivot arms, whereby the movement of said pivot arm rotates the counterweight arm on its pivot.

VERNON M. NIDEVER.